US010054036B2

(12) United States Patent
Hakeem et al.

(10) Patent No.: US 10,054,036 B2
(45) Date of Patent: Aug. 21, 2018

(54) METHODS AND SYSTEM FOR WATER INJECTION CONTROL (71) Applicant: Ford Global Technologies, LLC, Dearborn, MI (US)

(72) Inventors: Mohannad Hakeem, Dearborn, MI (US); Gopichandra Surnilla, West Bloomfield, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 15/384,253

(22) Filed: Dec. 19, 2016

(65) Prior Publication Data
US 2018/0171864 A1   Jun. 21, 2018

(51) Int. Cl.
F02B 29/00    (2006.01)
F02B 29/04    (2006.01)
F02D 41/00    (2006.01)
F02D 37/02    (2006.01)
F02P 5/15     (2006.01)
(Continued)

(52) U.S. Cl.
CPC .......... *F02B 29/0493* (2013.01); *F01N 13/10* (2013.01); *F02B 29/0475* (2013.01); *F02B 33/00* (2013.01); *F02D 35/027* (2013.01); *F02D 37/02* (2013.01); *F02D 41/0077* (2013.01); *F02D 41/26* (2013.01); *F02M 26/14* (2016.02); *F02M 26/20* (2016.02); *F02M 35/104* (2013.01); *F02M 35/1038* (2013.01);
(Continued)

(58) Field of Classification Search
CPC .. F02B 29/0493; F02B 29/0475; F02B 29/04; F02B 29/0406; F02B 29/0481

USPC ......................................... 123/563
See application file for complete search history.

(56) References Cited

U.S. PATENT DOCUMENTS 5,832,880 A     11/1998  Dickey
6,003,500 A  *  12/1999  Packard .............. F02B 29/0468
                                                            123/25 A
(Continued)

FOREIGN PATENT DOCUMENTS

EP        2607647 A1    6/2013

OTHER PUBLICATIONS

Hakeem, Mohannad, et al., "Methods and System for Adjusting Engine Operation Based on Evaporated and Condensed Portions of Water Injected at an Engine," U.S. Appl. No. 15/226,485, filed Aug. 2, 2016, 52 pages.

(Continued)

*Primary Examiner* — Thomas Moulis
(74) *Attorney, Agent, or Firm* — Julia Voutyras; McCoy Russell LLP (57) ABSTRACT

Methods and systems are provided for selecting a location for water injection during a water injection event based on ambient temperature and humidity, as well as engine operating conditions. In one example, a method may include injecting water upstream of a charge air cooler in response to operating the cooler in heater mode and injecting water downstream of the cooler in response to operating the cooler in cooler mode. Further, the method may include operating the cooler in heater mode based on dry, cold ambient conditions and a dilution demand and operating the cooler in cooler mode based on engine boost conditions and engine knock.

20 Claims, 4 Drawing Sheets (51) Int. Cl.

| | |
|---|---|
| *F02D 41/26* | (2006.01) |
| *F02M 35/10* | (2006.01) |
| *F02M 35/104* | (2006.01) |
| *F02B 33/00* | (2006.01) |
| *F01N 13/10* | (2010.01) |
| *F02D 35/02* | (2006.01) |
| *F02M 26/14* | (2016.01) |
| *F02M 26/20* | (2016.01) |

(52) U.S. Cl.
CPC ............... *F02M 35/10222* (2013.01); *F02M 35/10393* (2013.01); *F02P 5/15* (2013.01)

(56) References Cited

U.S. PATENT DOCUMENTS

| | | | |
|---|---|---|---|
| 6,026,641 | A | 2/2000 | Liberty |
| 6,112,705 | A | 9/2000 | Nakayama et al. |
| 6,301,887 | B1 * | 10/2001 | Gorel ............... F01N 3/0222 |
| | | | 123/563 |
| 6,988,485 | B2 | 1/2006 | Ichise et al. |
| 7,168,401 | B2 | 1/2007 | Johnson |
| 7,426,918 | B2 | 9/2008 | Brehob et al. |
| 7,581,528 | B2 | 9/2009 | Stein et al. |
| 8,127,745 | B2 | 3/2012 | Surnilla et al. |
| 8,352,162 | B2 | 1/2013 | Leone et al. |
| 8,522,760 | B2 | 9/2013 | Soltis |
| 9,038,580 | B2 | 5/2015 | Surnilla et al. |
| 9,169,755 | B2 | 10/2015 | Ulrey et al. |
| 9,188,056 | B2 * | 11/2015 | Glugla ............... F02B 29/0406 |
| 9,291,125 | B2 | 3/2016 | Yoshihara et al. |
| 9,297,296 | B2 * | 3/2016 | Kuske ............... F02B 37/00 |
| 2004/0182330 | A1 * | 9/2004 | Frutschi ............... F01K 21/047 |
| | | | 123/25 A |
| 2010/0121559 | A1 | 5/2010 | Bromberg et al. |
| 2011/0174267 | A1 | 7/2011 | Surnilla et al. |
| 2013/0206100 | A1 | 8/2013 | Yacoub |
| 2013/0218438 | A1 | 8/2013 | Surnilla et al. |
| 2014/0366508 | A1 | 12/2014 | Ulrey et al. |
| 2015/0345432 | A1 * | 12/2015 | De La Morena ...... F02M 26/24 |
| | | | 701/102 |
| 2016/0061100 | A1 * | 3/2016 | Radmard ............ F02B 29/0468 |
| | | | 60/599 |
| 2016/0146136 | A1 | 5/2016 | Surnilla et al. |
| 2016/0326992 | A1 * | 11/2016 | Keating ................ F02M 26/22 |

OTHER PUBLICATIONS

Hakeem, Mohannad, et al., "Methods and System for Selecting a Location for Water Injection in an Engine," U.S. Appl. Serial No. 15/226,548, filed Aug. 2, 2016, 52 pages.

Hakeem, Mohannad, et al., "Methods and System for Injecting Water at Different Groups of Cylinders of an Engine," U.S. Appl. No. 15/226,615, filed Aug. 2, 2016, 54 pages.

McQuillen, Michael, et al., "Method and System for Engine Water Injection," U.S. Appl. No. 15/384,150, filed Dec. 19, 2016, 48 pages.

McQuillen, Michael, et al., "Method and System for Pulsed Engine Water Injection," U.S. Appl. No. 15/384,172, filed Dec. 19, 2016, 49 pages.

McQuillen, Michael, et al., "Method and System for Engine Water Injection," U.S. Appl. No. 15/384,188, filed Dec. 19, 2016, 50 pages.

McQuillen, Michael, et al., "Method and System for Adjusting Engine Water Injection," U.S. Appl. No. 15/384,204, filed Dec. 19, 2016, 75 pages.

McQuillen, Michael, et al., "Method and System for Adjusting Engine Water Injection," U.S. Appl. No. 15/384,223, filed Dec. 19, 2016, 77 pages.

Shelby, Michael Howard, et al., "Method and System for Engine Water Injection," U.S. Appl. No. 15/384,243, filed Dec. 19, 2016, 55 pages.

\* cited by examiner

FIG. 4

METHODS AND SYSTEM FOR WATER INJECTION CONTROL

FIELD

The present description relates generally to methods and systems for injecting water into an engine having a charge air cooler.

BACKGROUND/SUMMARY

Internal combustion engines may include water injection systems that inject water from a storage tank into a plurality of locations, including an intake manifold, upstream of engine cylinders, into an intake port, upstream of cylinder intake valves, or directly into engine cylinders. One example of an engine system with multiple injector locations is shown by Brehob et al. in U.S. Pat. No. 7,426,918. Injecting water into the engine intake air may increase fuel economy and engine performance, as well as decrease engine emissions. When water is injected into the engine intake or cylinders, heat is transferred from the intake air and/or engine components to the water. This heat transfer leads to evaporation, which results in cooling. Injecting water into the intake air (e.g., in the intake manifold) lowers both the intake air temperature and a temperature of combustion at the engine cylinders. By cooling the intake air charge, a knock tendency may be decreased without enriching the combustion air-fuel ratio. This may also allow for a higher compression ratio, advanced ignition timing, and decreased exhaust temperature. As a result, fuel efficiency is increased. Additionally, greater volumetric efficiency may lead to increased torque.

However, water injection benefits may be limited by the relative humidity of the aircharge. As an example, the charge cooling effect of the water injection relies on the evaporative cooling of the injected water. However, when the air is humid, a smaller fraction of the injected water is able to evaporate, resulting in less charge cooling. The charge dilution effect of the water injection, on the other hand, relies on the presence of water dispersed in warmer air, which improves during humid conditions.

The inventors herein have further recognized that coolant flow through a charge air cooler (CAC) is used to maintain the temperature of aircharge exiting the cooler. During conditions when boost is provided by the upstream compressor, aircharge entering the cooler is hot, and the coolant flow cools the aircharge before it enters the engine. In other words, the CAC operates in a cooling mode with heat flowing from the aircharge into the coolant. However, during conditions when the aircharge entering the cooler is cold, coolant flow through the charge air cooler may be used to warm the aircharge. In other words, the charge air cooler will operate in a heating mode with heat flowing from the coolant into the aircharge. Consequently, water injection benefits may be improved by injecting water upstream of a charge air cooler during dry and cold ambient conditions while injecting water downstream of the charge air cooler during humid or warm conditions. By leveraging the different directions of heat flow at the CAC, during cold and dry conditions, a pre-CAC water injection may be used to heat and humidify the air delivered to the engine. In comparison, during hot conditions, a post-CAC water injection may be used to provide charge cooling. One example engine method includes: injecting a larger proportion of water upstream of a charge air cooler while operating the cooler in a heating mode; and injecting a larger proportion of water downstream of the charge air cooler while operating the cooler in a cooling mode.

As an example, in response to an engine dilution demand received while the engine is operated with natural aspiration, a water injection amount required to address the engine dilution demand may be determined. If the ambient conditions are dry and cold at the time of the engine dilution demand (such as when a vehicle is driving through desert regions), a larger portion of the determined water injection amount may be injected into the engine, upstream of a CAC, and a remaining, smaller portion of the determined water injection amount may be injected downstream of the CAC. In comparison, in response to an engine cooling demand (such as for knock relief) received while the engine is operated with boost, a water injection amount required to engine cooling may be determined. If the ambient conditions are warm or hot at the time of the engine cooling demand, a larger portion of the determined water injection amount may be injected into the engine, downstream of the CAC, and a remaining, smaller portion of the determined water injection amount may be directly injected into an engine cylinder or upstream of the CAC. In each case, the amount of water injected may be adjusted taking into account the condensate level at the CAC so as to reduce the likelihood of condensate-induced misfire events.

In this way, water injection benefits can be extended by using airflow through a CAC during cold, dry conditions in conjunction with water injection at a pre-CAC location to heat and humidify an aircharge before delivering it to an engine. By injecting the water at a pre-CAC location, the heat of evaporation is added to the water, increasing the overall amount of water that can be injected into the engine (relative to a post-CAC location), thereby enhancing the charge dilution effect of the water injection. By drawing heat out of coolant circulating through the CAC during cold ambient conditions, the aircharge can be heated upon passage through the CAC, without the need for a dedicated heater. By using airflow through the CAC during hot, boosted conditions in conjunction with water injection at a post-CAC location to cool the aircharge before delivering it to an engine, the charge cooling ability of the water injection is improved. By providing knock relief via a charge cooling water injection, reliance on spark retard usage is reduced, improving fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for extending the benefits of water injection from a water injection system coupled to a vehicle engine, as described with reference to the vehicle system of FIG. 1. The engine system may be configured to inject water at various locations, including locations upstream and downstream of a charge air cooler (CAC), to provide diverse water injection benefits such as charge air cooling, engine component cooling, and engine dilution. A controller may be configured to perform a control routine, such as the example routine of FIG. 3, to select between an amount of water to inject into a pre-CAC location relative to a post-CAC location based on engine cooling and dilution demands, and further based on ambient temperature and humidity conditions. Due to change in relative humidity with temperature and pressure (as shown at FIG. 2), the charge cooling benefits of a water injection can be enhanced by injecting the water at a post-CAC location. In comparison, the charge dilution benefits of a water injection can be enhanced by injecting the water at a pre-CAC location. An example water injection is shown at FIG. 4. By enabling more water to be injected into the engine, water injection benefits may be extended over a wider range of engine operating conditions. As a result, water usage may be improved to enable significant fuel economy improvements to a vehicle's performance.

Figure 1:
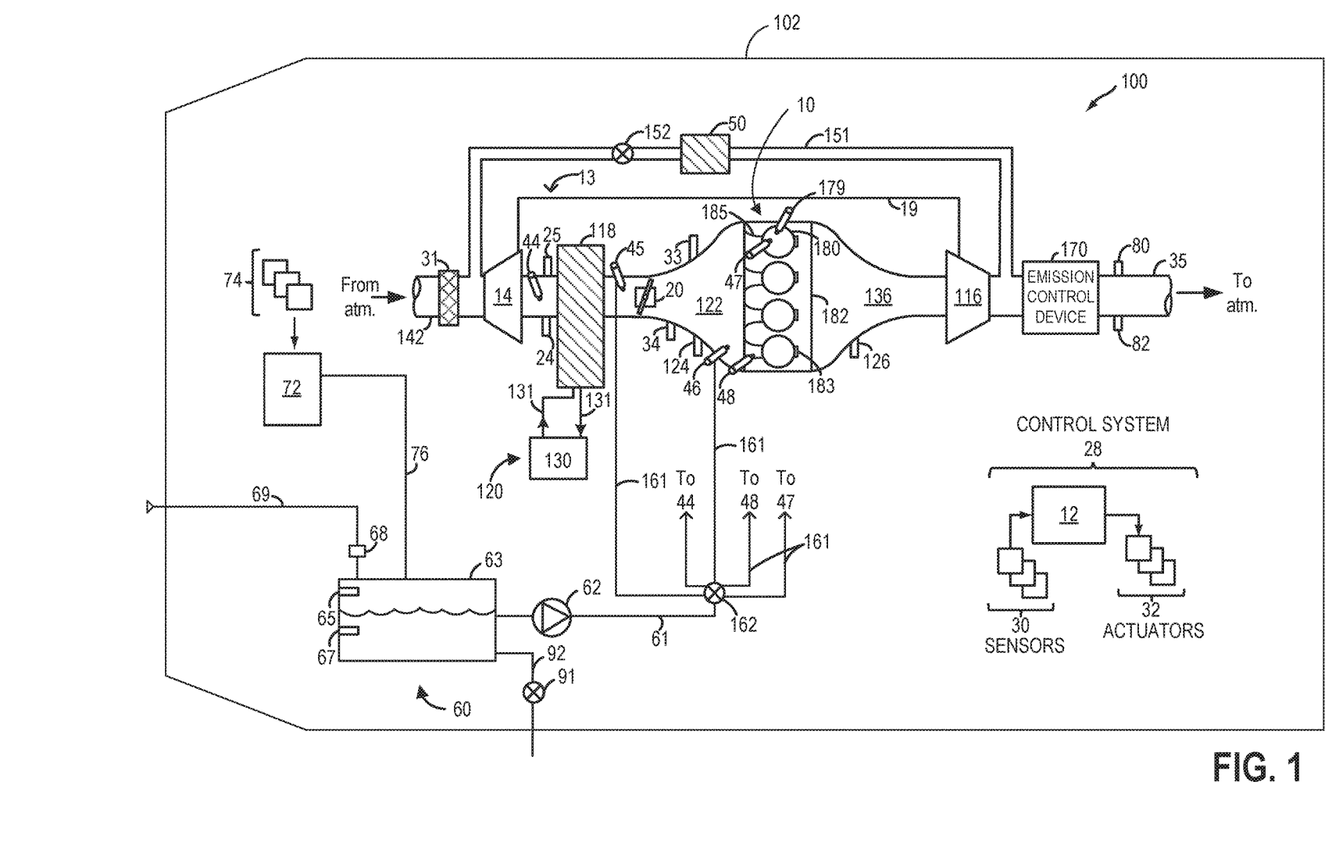
FIG. 1 shows a schematic diagram of an engine system configured for water injection.
Figure 2:
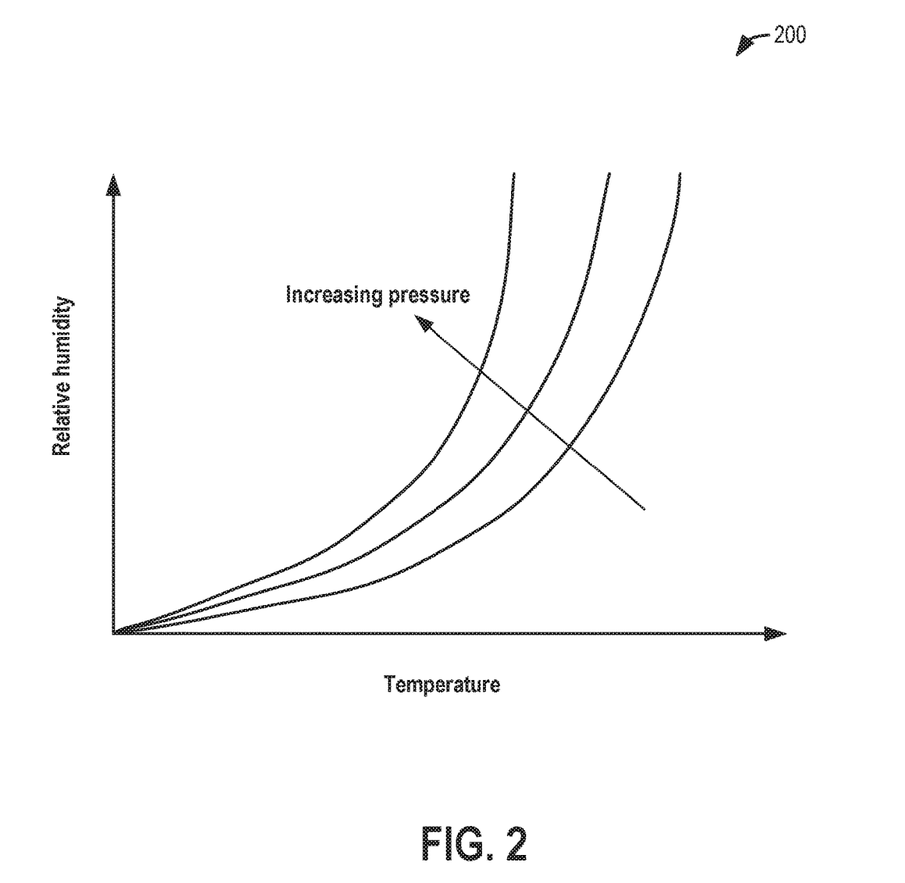
FIG. 2 shows an example change in relative humidity with ambient temperature and pressure.

FIG. 1 shows an example embodiment of an engine system 100 configured with a water injection system 60. Engine system 100 is coupled in motor vehicle 102, illustrated schematically. Engine system 100 includes an engine 10, depicted herein as a boosted engine coupled to a turbocharger 13 including a compressor 14 driven by a turbine 116. Specifically, fresh air is introduced along intake passage 142 into engine 10 via air cleaner 31 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 118 to throttle valve (e.g., intake throttle) 20. The CAC may be an air-to-air or air-to-coolant (as in the present example) heat exchanger. Throttle valve 20 is coupled to engine intake manifold 122. From the compressor 14, the hot compressed air charge enters the inlet of the CAC 118, cools as it travels through the CAC, and then exits to pass through the throttle valve 20 to the intake manifold 122. In the embodiment shown in FIG. 1, the pressure of the air charge within the intake manifold is sensed by manifold absolute pressure (MAP) sensor 124 and a boost pressure is sensed by boost pressure sensor 24. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened responsive to compressor surge.

Additionally, CAC 118 is thermally coupled to coolant system 120. Coolant system 120 may include radiator 130 for dissipating heat from warmed coolant to the atmosphere. Coolant system 120 may further include additional coolant lines or loops (not shown) that couple the coolant system to the engine system so that coolant can be circulated around the engine block 182 (to expedite engine heating) and/or through EGR cooler 50. Heat transfer between CAC 118 and coolant system 120 is used to maintain a temperature of aircharge that exits CAC 118 (e.g., at or around 35° C.). During boosted engine operation, intake air compressed at compressor 14 is delivered to the engine upon passage through the CAC 118. Upon passage through the compressor, the air is heated. Therefore during boosted engine operation, the CAC is operated in a cooling mode where heat from the air is rejected into coolant flowing through the CAC, cooling the air to a target temperature. Warmed coolant (which may be water or other possible coolant fluids) enters radiator 130 via coolant loop 131, where the heat is dissipated to the atmosphere (or transferred to the engine block to expedite engine heating). Then, cooled coolant exits radiator 130 and flows back to CAC 118 via coolant loop 131. (Arrows indicate the direction of coolant flow). In comparison, during naturally aspirated conditions, when the intake air is at ambient conditions, the CAC is operated in a heating mode where heat from the coolant is rejected into the air, warming the air to the target temperature.

Intake manifold 122 is coupled to a series of combustion chambers or cylinders 180 through a series of intake valves (not shown) and intake runners (e.g., intake ports) 185. As shown in FIG. 1, the intake manifold 122 is arranged upstream of all combustion chambers 180 of engine 10. Additional sensors, such as manifold charge temperature (MCT) sensor 33 and air charge temperature sensor (ACT) 25 may be included to determine the temperature of intake air at the respective locations in the intake passage. The air temperature may be further used in conjunction with an engine coolant temperature to compute the amount of fuel that is delivered to the engine, for example.

Each combustion chamber may further include a knock sensor 183 for identifying and differentiating abnormal combustion events, such as knock and pre-ignition. In alternate embodiments, one or more knock sensors 183 may be coupled to selected locations of the engine block. Further, as explained further below with reference to FIG. 5, an output of the knock sensors may be used to detect maldistribution of water to individual engine cylinders, where the water is injected upstream of all the combustion chambers 180.

The combustion chambers are further coupled to exhaust manifold 136 via a series of exhaust valves (not shown). The combustion chambers 180 are capped by cylinder head 182 and coupled to fuel injectors 179 (while only one fuel injector is shown in FIG. 1, each combustion chamber includes a fuel injector coupled thereto). Fuel may be delivered to fuel injector 179 by a fuel system (not shown) including a fuel tank, a fuel pump, and a fuel rail. Fuel injector 179 may be configured as a direct injector for injecting fuel directly into combustion chamber 180, or as a port injector for injecting fuel into an intake port upstream of an intake valve of the combustion chamber 180.

In the depicted embodiment, a single exhaust manifold 136 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 136 upstream of turbine 116. Alternatively, a two-state exhaust gas oxygen sensor may be substituted for UEGO sensor 126.

As shown in FIG. 1, exhaust from the one or more exhaust manifold sections is directed to turbine 116 to drive the turbine. When reduced turbine torque is desired, some exhaust may be directed instead through a waste gate (not shown), by-passing the turbine. The combined flow from the turbine and the waste gate then flows through emission control device 170. In general, one or more emission control devices 170 may include one or more exhaust after-treatment catalysts configured to catalytically treat the exhaust flow, and thereby reduce an amount of one or more substances in the exhaust flow.

All or part of the treated exhaust from emission control device 170 may be released into the atmosphere via exhaust conduit 35. Depending on operating conditions, however, some exhaust may be diverted instead to an exhaust gas recirculation (EGR) passage 151, through EGR cooler 50 and EGR valve 152, to the inlet of compressor 14. In this manner, the compressor is configured to admit exhaust tapped from downstream of turbine 116. The EGR valve 152 may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and increased performance. In other embodiments, the EGR system may be a high pressure EGR system with EGR passage 151 connecting from upstream of the turbine 116 to downstream of the compressor 14. In some embodiments, the MCT sensor 33 may be positioned to determine the manifold charge temperature, wherein the charge may include air and exhaust recirculated through the EGR passage 151.

Intake manifold 122 may further include an intake gas oxygen sensor 34. In one example, the oxygen sensor is a UEGO sensor. The intake gas oxygen sensor may be configured to provide an estimate regarding the oxygen content of fresh air received in the intake manifold. In addition, when EGR is flowing, a change in oxygen concentration at the sensor may be used to infer an EGR amount and used for accurate EGR flow control. In the depicted example, oxygen sensor 34 is positioned downstream of throttle 20 and downstream of charge air cooler 118. However, in alternate embodiments, the oxygen sensor may be positioned upstream of the throttle. Intake oxygen sensor 34 may be used for estimating an intake oxygen concentration and inferring an amount of EGR flow through the engine based on a change in the intake oxygen concentration upon opening of the EGR valve 152. Likewise, intake oxygen sensor 34 may be used for estimating an intake oxygen concentration and inferring an engine dilution or a change in intake humidity based on a change in the intake oxygen concentration following an intake manifold water injection.

Combustion chamber 180 also receives water and/or water vapor via water injection system 60. Water from water injection system 60 may be injected into the engine intake or directly into the combustion chambers 180 by one or more of water injectors 44-48. As one example, water may be injected into intake manifold 122, upstream of CAC 118 via water injector 44 or downstream of CAC 118 and upstream of throttle 20 via water injector 45, herein also referred to as central water injection.

Figure 3:
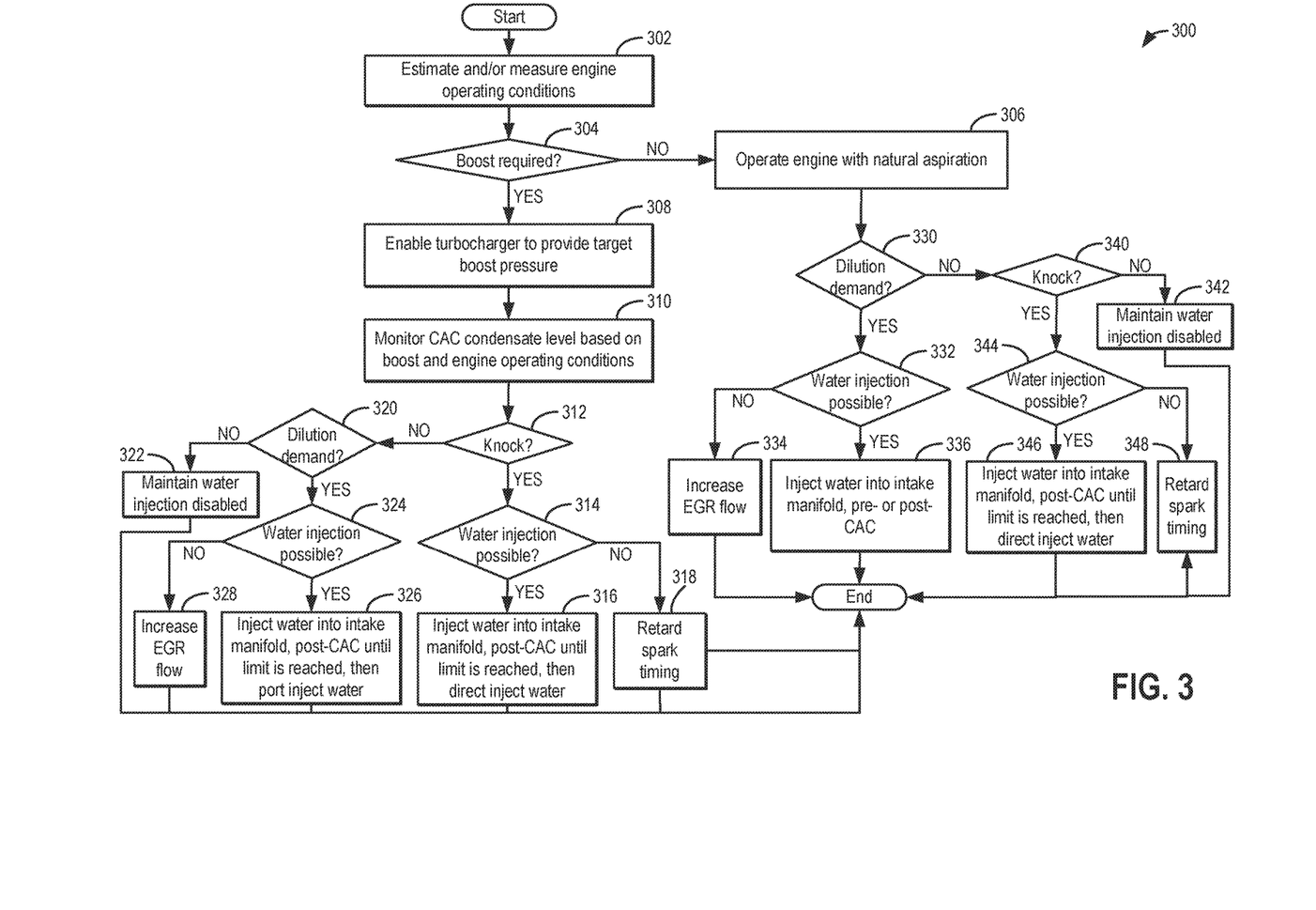
FIG. 3 shows a high level flow chart for varying a water injection location with change in ambient temperature and humidity.
Figure 4:
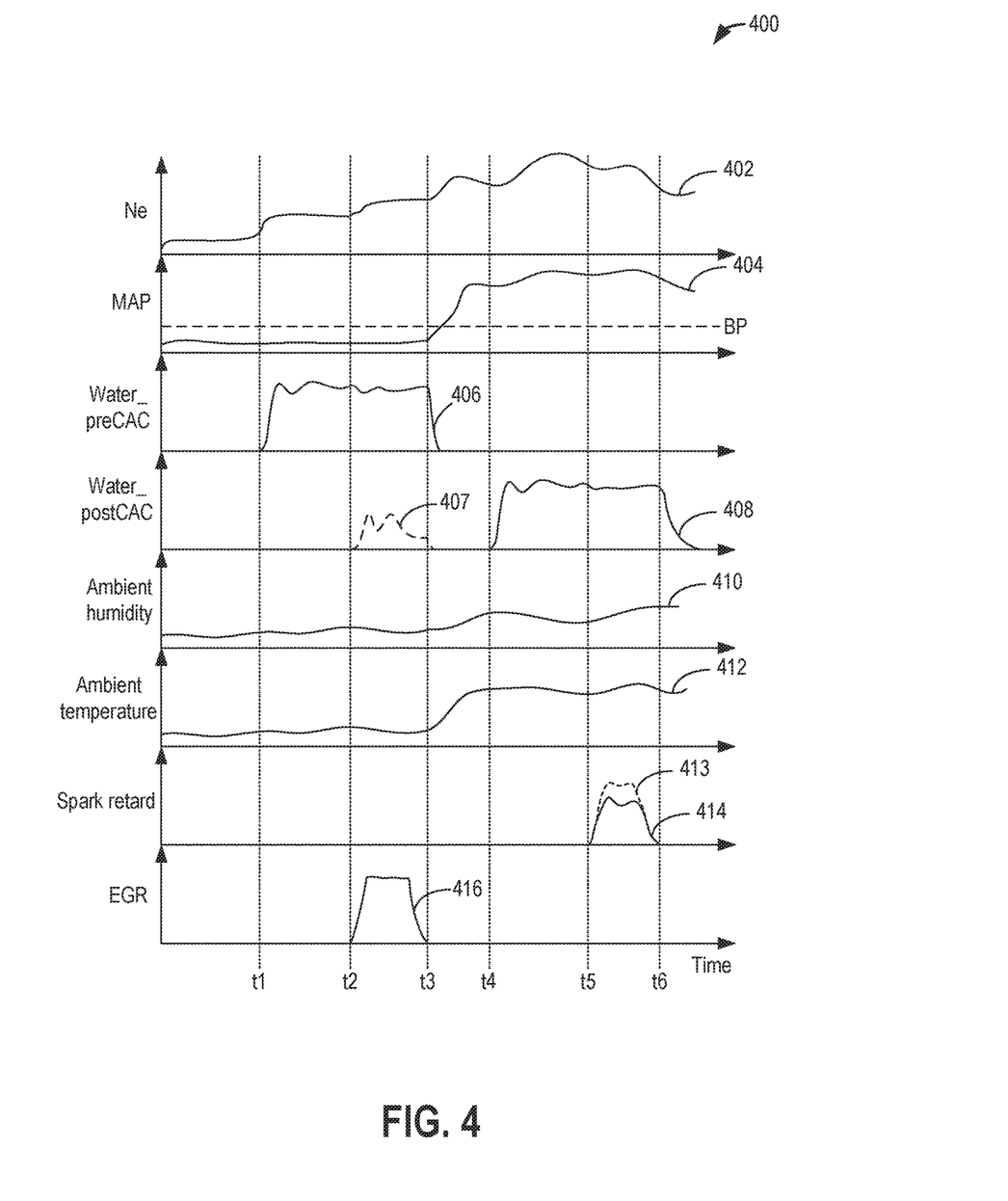
FIG. 4 shows a graph depicting example adjustments to a water injection amount and timing to compensate for water maldistribution between cylinders.

As elaborated with reference to FIG. 3, water injection upstream of the CAC during conditions when the CAC is being operated in the heating mode can be advantageously used to improve the charge dilution effect of a manifold water injection. For example, during conditions when the intake air is dry (relative humidity is lower than a threshold) and the engine is operating non-boosted, a pre-CAC water injection may be used to provide warm, moist air at the CAC outlet. CAC heat may be used to raise the temperature of the water (e.g., to 35° C.) and raise the humidity of the aircharge (e.g., to 100% RH). In comparison, water injection downstream of the CAC during conditions when the CAC is being operated in the cooling mode can be advantageously used to improve the charge cooling effect of a manifold water injection. For example, during conditions when the intake air is humid (relative humidity is higher than the threshold) and the engine is operating boosted, a post-CAC water injection may be used to cool the air down to the dew point of a lower temperature (e.g., ~15° C.) even when the air leaving the CAC is warmer (e.g., at 35° C.) to provide warm, moist air at the CAC outlet.

As another example, water may be injected into intake manifold 122, downstream of the throttle in one or more locations, via water injector 46. As yet another example, water may be injected into one or more intake runners (e.g., intake ports) 185 via water injector 48 (herein also referred to as port water injection), and/or directly into combustion chamber 180 via water injector 47 (herein also referred to as direct water injection). In one embodiment, injector 48 arranged in the intake runners may be angled toward and facing the intake valve of the cylinder which the intake runner is attached to. As a result, injector 48 may inject water directly onto the intake valve, resulting in faster evaporation of the injected water and a higher dilution benefit from the water vapor. In another embodiment, injector 48 may be angled away from the intake valve and arranged to inject water against the intake air flow direction through the intake runner. As a result, more of the injected water may be entrained into the air stream, thereby increasing the charge cooling benefit of the water injection.

Though only one representative injector 47 and injector 48 are shown in FIG. 1, each of combustion chamber 180 and intake runner 185 may include its own injector. In alternate embodiments, water injection system 60 may include water injectors positioned at one or more of these positions. For example, the engine may include only water injector 46, in one embodiment. In another embodiment, the engine may include each of water injector 46, water injectors 48 (one at each intake runner), and water injectors 47 (one at each combustion chamber).

Water injection system 60 may include a water storage tank 63, a water lift pump 62, a collection system 72, and a water filling passage 69. Water stored in water tank 63 is delivered to water injectors 45-48 via water passage 61 and conduits or lines 161. In embodiments that include multiple injectors, water passage 61 may contain a valve 162 (e.g., diverter valve, multi-way valve, proportioning valve, etc.) to direct water to the different water injectors via the corresponding conduits. Alternatively, each conduit (or water line) 161 may include respective valves within the water injectors 45-48, for adjusting water flow there-through. In addition to water lift pump 62, one or more additional pumps may be provided in conduits 161 for pressurizing the water directed to the injectors, such as in the conduit coupled to direct water injector 47.

Water storage tank 63 may include a water level sensor 65 and a water temperature sensor 67, which may relay information regarding water conditions to controller 12. For example, in freezing conditions, water temperature sensor 67 detects whether the water in tank 63 is frozen or available for injection. In some embodiments, an engine coolant passage (not shown) may be thermally coupled with storage tank 63 to thaw frozen water. The level of water stored in water tank 63, as identified by water level sensor 65, may be communicated to the vehicle operator and/or used to adjust engine operation. For example, a water gauge or indication on a vehicle instrument panel (not shown) may be used to communicate the level of water. If the level of water in the water tank 63 is higher than a threshold level, it may be inferred that there is sufficient water available for injection, and accordingly water injection may be enabled by the controller. Else, if the level of water in the water tank 63 is lower than the threshold level, it may be inferred that there is insufficient water available for injection, and therefore water injection may be disabled by the controller.

In the depicted embodiment, water storage tank 63 may be manually refilled via water filling passage 69 and/or refilled automatically by the collection system 72 via water tank filling passage 76. Collection system 72 may be coupled to one or more vehicle components 74 so that the water storage tank can be refilled on-board the vehicle with condensate collected from various engine or vehicle systems. In one example, collection system 72 may be coupled with an EGR system and/or exhaust system to collect water condensed from exhaust passing through the system. In another example, collection system 72 may be coupled with an air conditioning system (not shown) for collected water condensed from air passing through an evaporator. In yet another example, collection system 72 may be coupled with an external vehicle surface to collect rain or atmospheric condensation. Manual filling passage 69 may be fluidically coupled to a filter 68, which may remove some impurities contained in the water. A drain 92 including a drain valve 91 may be used to drain water from the water storage tank 63 to a location outside the vehicle (e.g., onto the road), such as when a quality of the water is deemed to be lower than a threshold and not suitable for injection into the engine (e.g., due to high conductivity, high particulate matter content). In one example, the quality of the water may be assessed based on the output of a sensor coupled to water injection system 60, in water line 61. For example, the water quality may be assessed based on the output of a conductivity sensor, a capacitance sensor, optical sensor, turbidity sensor, density sensor, or some other type of water quality sensor.

FIG. 1 further shows a control system 28. Control system 28 may be communicatively coupled to various components of engine system 100 to carry out the control routines and actions described herein. Control system 28 may include an electronic digital controller 12. Controller 12 may be a microcomputer, including a microprocessor unit, input/output ports, an electronic storage medium for executable programs and calibration values, random access memory, keep alive memory, and a data bus. Controller 12 may receive input from a plurality of sensors 30, such as the various sensors of FIG. 1, to receive input including transmission gear position, accelerator pedal position, brake demand, vehicle speed, engine speed, mass airflow through the engine, boost pressure, ambient conditions (temperature, pressure, humidity), etc. Other sensors include CAC 118 sensors, such as CAC inlet air temperature, ACT sensor 125, exhaust pressure and temperature sensors 80, 82, and pressure sensor 124, CAC outlet air temperature sensor, and MCT sensor 33, intake oxygen sensor (IAO2) 34, knock sensor 183 for determining ignition of end gases and/or water distribution among cylinders, and others. The controller 12 receives signals from the various sensors of FIG. 1 and employs the various actuators of FIG. 1 to adjust engine operation based on the received signals and instructions stored on a memory of the controller. For example, injecting water to the engine may include adjusting a pulse-width of injectors 44-48 to vary an amount of water injected while also adjusting a timing of the water injection and a number of injection pulses. In some examples, the storage medium may be programmed with computer readable data representing instructions executable by the processor for performing the methods described below (e.g., at FIG. 3) as well as other variants that are anticipated but not specifically listed.

In this way, the system of FIG. 1 enables a vehicle system comprising: an engine; a compressor for providing a boosted aircharge to the engine; a charge air cooler coupled downstream of the compressor; a coolant system for circulating coolant through the charge air cooler and the engine; a first water injector coupled upstream of the charge air cooler and downstream of the compressor; a second water injector coupled downstream of the charge air cooler; an EGR passage including an EGR valve for recirculating exhaust gas from an exhaust manifold to an intake manifold, upstream of the compressor; a humidity sensor coupled to the intake manifold, upstream of the compressor, for estimating an ambient humidity; a temperature sensor coupled to the intake manifold, upstream of the compressor, for estimating an ambient temperature; and a controller with computer readable instructions for: responsive to ambient temperature being lower than a threshold temperature, injecting more water into the engine, upstream of the charge air cooler than downstream of the charge cooler, while maintaining the compressor disabled; and responsive to ambient temperature being higher than the threshold temperature, injecting more water into the engine, downstream of the charge air cooler than upstream of the charge air cooler, while enabling the compressor.

The inventors herein have recognized that the change in humidity with temperature, and pressure can be leveraged to enhance the charge dilution effects of a water injection during dry and/or cold conditions, and enhance the charge cooling effects of a water injection during warm and/or moist conditions. For example, a CAC temperature (or temperature of aircharge at the outlet of the CAC) can be held at a substantially constant temperature while varying the outlet temperature and humidity by injecting water upstream of the CAC (to maximize the dilution effect) or downstream of the CAC (to maximize the cooling effect).

An example relationship between relative humidity and temperature, as well as manifold pressure, is shown at map 200 of FIG. 2. In one example, the map of FIG. 2 may be generated during engine calibration and stored in the engine controller's memory. The controller may then reference the map during engine operation to determine where to inject water at an engine responsive to changes in ambient temperature and humidity.

Map 200 shows that at a given pressure (e.g., a given MAP), the amount of water that can be entrained in the air (indicated by the relative humidity) increases as the temperature of the air increases. Further, the total amount of water that can be entrained in the air, at a given temperature, increases as the pressure increases. Therefore during dry and cold conditions, it is desired to condition the intake air to match engine mapping conditions by heating the air, in addition to injecting water into it. This is particularly beneficial under part-load condition since the dilution effect of water injection is advantageous to reduce pumping losses similar to EGR. While post-CAC water injection raises the intake air relative humidity, it comes at the cost of reducing the temperature, which counters the effect of the CAC that was used in heating mode. In this case, pre-CAC injection is more beneficial because the dry and cold air carries as much water as needed and the water may be heated by using the CAC in reverse mode; this procedure conditions the intake air charge to the most desired temperature and relative humidity state under a wider range of environmental and operating conditions. The result is a warm, moist aircharge that exits the CAC, providing significant engine dilution.

During moist conditions, a charge cooling effect is provided by cooling boosted air upon passage through the CAC operating in the cooling mode and injecting water at a post-CAC location. The post-CAC evaporation cools the air down to the dew point of ~15° C. even when the air leaving the CAC is at 35° C. Since no heat of evaporation is transferred to the air, the air-water mixture is able to draw heat of evaporation from the manifold, enhancing the charge cooling effect provided by the pst-CAC injection.

Turning to FIG. 3, an example method 300 for injecting water into an engine is depicted. Injecting water may include injecting water via one or more water injectors of a water injection system, such as the water injection system 60 shown in FIG. 1. Instructions for carrying out method 300 and the rest of the methods included herein may be executed by a controller (such as controller 12 shown in FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, the controller may send a signal to an actuator for a water injector to inject water at a location of an engine. The method enables water to be injected into an engine intake manifold at a location upstream or downstream of a CAC based on sensor feedback, such as based on feedback from an intake manifold oxygen sensor and a knock sensor, to provide charge dilution or charge cooling benefits.

The method 300 begins at 302 by estimating and/or measuring engine operating conditions. Engine operating conditions estimated may include manifold pressure (MAP), ambient conditions (ambient temperature, pressure, humidity), exhaust air-fuel ratio (A/F), exhaust gas recirculation (EGR) flow rate, mass air flow (MAF), manifold charge temperature (MCT), engine speed and/or load, driver torque demand, engine temperature, exhaust catalyst temperature, etc.

Next, at 304, the method includes determining whether boost is required. In one example, boost may be required in response to engine speed and/or load being higher than a threshold. As an example, engine speed/load may be increased responsive to an increase in driver torque demand following an operator tip-in event.

If boost is required, at 308, the method includes operating a compressor (e.g., a turbocharger compressor) to provide a target boost pressure. For example, the controller may close an exhaust waste gate to expedite turbine spin-up, and thereby increase compressor speed. In embodiments where the compressor is coupled to an electric motor (e.g., a supercharger compressor), operating the compressor may include actuating the motor to a motor speed that raises the compressor to the target speed. The engine may then be operated boosted.

Next, at 310, the method includes monitoring CAC condensate level based on boost and engine operating conditions. Operating the engine boosted includes flowing air that is compressed and heated at the compressor through a CAC to cool the air before delivery to the engine. Therefore during boosted engine operation, the CAC operates in a cooling mode with heat from the flowing air being transferred to coolant circulating through the CAC. During the rapid local cooling, the temperature of the air may be lowered below a dew point, resulting in moisture condensing out. At least a portion of the condensate may be accumulated at a trap at the bottom of the CAC. The CAC condensate level may vary with the boost pressure, the condensate level increasing as the boost pressure is increased, and as a duration of engine operation with boost increases. The CAC condensate level may also vary with ambient conditions, the condensate level increasing as the ambient humidity increases. The CAC condensate level may be continually monitored during boosted engine operation and compared to a threshold above which condensate may unintentionally be ingested in the engine, leading to potential misfires. Responsive to the CAC condensate level exceeding the threshold, the accumulated condensate may be opportunistically delivered to the engine, e.g., during steady-state or cruise conditions, at a controlled rate of ingestion.

At 312, the method includes determining if there is an indication of knock. The indication of knock may include detection of an actual knock event or anticipation of knock based on engine operating conditions. The controller may determine whether knock is occurring based on output from one or more knock sensors (such as knock sensors 183 shown in FIG. 1). In one example, engine knock may be indicated when the knock sensor output is higher than a knock threshold. In another example, engine knock may be anticipated when the engine speed and/or load is greater than a threshold, or when the engine knock history reflects a high propensity for knock (e.g., higher than threshold knock count). When the engine is knock limited, water injection may be used in order to provide charge cooling which reduces the propensity for further knock.

If knock is detected, the method continues at 314 wherein it is determined whether water injection is possible. In one example, water injection may not be possible when water is not available for injection. For example, water may not be available for water injection if a water level in a water storage tank (such as water storage tank 63 shown in FIG. 1) is below a threshold. In another example, water may not be available for injection if one or more of a water temperature and water quality of water in the water storage is unsuitable for injection. In still another example, water injection may not be possible if the engine load is less than a threshold load or if spark timing is retarded by less than a threshold amount. During such conditions, water injection may result in misfires. If water is not available for injection due to low availability, the controller may increase on-board water collection. This may include collecting water from vehicle systems, such as collecting water from a water collection system coupled to a water storage tank of a water injection system of the engine. For example, vehicle air-conditioning compressor operation may be adjusted to increase AC condensate collection. As another example, EGR flow may be adjusted to increase EGR condensate collection. As yet another example, condensate collection from the vehicle surface may be increased. The collected water may be stored at the water storage tank. In another example, the controller may send a notification to the vehicle operator to manually refill the water tank.

If water injection is not possible at 314, at 318, the method includes retarding spark timing to provide knock relief. In response to the indication of knock, the controller may adjust one or more engine operating conditions to provide knock relief. For example, the controller may retard spark timing (further) from MBT, the degree of spark retard applied based on the knock intensity. In another example, the controller may additionally or alternatively increase a pulse width of fuel directly injected into the knock affected cylinder to enrich the combustion air-fuel ratio. Further still, the controller may reduce an amount of throttle opening to decrease manifold pressure.

However, if water injection is possible, at 316, the method includes injecting water into the intake manifold, at a location downstream of the CAC (post-CAC). The amount of water injected is based on the knock indication. In one example, the controller may refer a look-up table stored in the controller's memory having knock sensor output as the input and the water injection amount to be commanded as the output. In another example, the look-up table may be stored having engine speed-load as the input and the water injection amount to be commanded as the output. The controller may send a pulse-width signal corresponding to the commanded amount to the manifold water injector located downstream of the CAC. If the commanded water injection amount causes the manifold water injection to exceed a limit, then the controller may adjust the pulse width commanded to the manifold water injector until the water injection limit of the manifold injector is reached. Thereafter, a remainder of the total water amount to be commanded may be delivered by direct injecting water. Additionally or optionally, the remainder of the total amount of water may be delivered by port injecting water away from an open intake valve so that the injected water can get entrained in the airflow before reaching the cylinder. In one example, the water injection limit of the manifold injector may include a pulse width limit of the injector. In another example, the water injection limit of the manifold injector may be reached when the flow rate of the injector reaches a limit. In yet another example, the water injection limit of the manifold injector may be reached when the manifold humidity in the vicinity of the injector reaches a saturation limit.

The determined (e.g. commanded) amount of water may be delivered into the intake manifold as a single pulse per engine cycle or as a series of pulses timed to the intake valve opening of each cylinder within the cylinder group downstream of the injector.

In still further examples, the water injection amount may be adjusted based on the level of CAC condensate. The CAC is operated to cool down the intake air charge up to few degrees above the dew point temperature to avoid condensation. After the air exits the CAC, the relative humidity of the air decreases while its specific humidity remains the same, allowing for more water to be injected at a post-CAC location up to 100% relative humidity limit.

By delivering water downstream of the CAC responsive to knock during boosted conditions, heat of evaporation is drawn from the manifold increasing the charge cooling effect of the water injection.

If knock is not detected at 312, the method continues at 320 and includes determining whether there is a dilution demand. For example, dilution may be demanded when the engine speed/load is low and/or when combustion stability is at or near a limit. The controller may refer a look-up table that uses engine speed and load as an input and provides a dilution amount to be commanded as an output. In one example, increased dilution may be requested in response to an engine speed/load being below a threshold, where the threshold engine speed/load may be indicative of a speed-load region where pumping losses are more likely to occur. In another example, charge dilution may be demanded when the engine is at or near a combustion stability limit. If there is no dilution demand, at 322, the method includes maintaining water injection disabled. Additionally, the method at 322 includes continuing engine operation without injecting water. If there is a dilution demand, the method continues at 324 wherein it is determined whether water injection is possible. As described above with regard to the method at 314, water injection may not be possible when water is not available for injection. If water injection is not possible, the method continues to 328 to adjust one or more engine operating parameters to provide the required dilution. This may include increasing EGR flow (amount and rate) by increasing an opening of the EGR valve.

However, if water injection is possible at 324, the method at 326 includes injecting water into the intake manifold, downstream of the CAC (post-CAC), until a limit is reached and then port injecting water. The controller may send a signal to an actuator of a water injector to inject water an amount of water via a manifold water injector downstream upstream of a CAC (such as water injector 44 shown in FIG. 1). The amount of water injected is based on the dilution demand. In one example, the controller may refer a look-up table stored in the controller's memory having an exhaust oxygen sensor output and/or an amount of dilution requested as the input and the water injection amount to be commanded as the output. In another example, the look-up table may be stored having engine speed-load as the input and the water injection amount to be commanded as the output. The controller may send a pulse-width signal corresponding to the commanded amount to the manifold water injector located downstream of the CAC. If the commanded water injection amount causes the manifold water injection to exceed a limit, then the controller may adjust the pulse-width commanded to the manifold water injector until the water injection limit of the manifold injector is reached. In one example, the water injection limit of the manifold injector may include a pulse-width limit of the injector. In another example, the water injection limit of the manifold injector may be reached when the flow rate of the injector reaches a limit. In yet another example, the water injection limit of the manifold injector may be reached when the manifold humidity in the vicinity of the injector reaches a saturation limit. Thereafter, a remainder of the total water amount to be commanded may be delivered by port injecting water. For example, responsive to the dilution demand, the controller may command water injection from port water injectors angled toward the intake valves and synchronizing a timing of the water injection with intake valve timing such that water is injected onto a hot closed intake valve. Alternatively, the port water injectors may be angled towards the intake valve and configured to inject onto the valve surface and/or surrounding manifold surface. By delivering water onto the closed intake valve and/or manifold surface responsive to dilution demand, the injected water evaporates on the hot engine surfaces, thereby increasing the dilution effect of the water injection. Returning to the method at 304, if boost is not required, at 306 the method includes operating the engine with natural aspiration. Operating with natural aspiration includes maintaining the turbocharger disabled. As an example, boost is not required when the engine is idling, or when the engine speed/load is lower than a threshold.

Next, at 330, the method includes determining whether there is a dilution demand. If there is no dilution demand, the method continues at 332 wherein it is determined whether water injection is possible. As described above with regard to the method at 314, water injection may not be possible when water is not available for injection. If water injection is not possible, the method continues to 334 to adjust one or more engine operating parameters to provide the required charge dilution, such as by increasing EGR flow. In one example, adjusting engine operating parameters to achieve the required dilution may include determining an amount of EGR to supply to the engine. The controller may refer a look-up table that uses engine speed and load as an input and provides an amount of EGR to be commanded as an output. The controller may increase EGR flow (amount and rate) by increasing an opening of the EGR valve. As a result, EGR may be used to achieve the required dilution when water injection is unavailable.

However, if water injection is possible, the method at 336 includes injecting water into the intake manifold, pre-CAC or post-CAC. The amount of water injected is based on the dilution required and the intake air temperature and humidity condition. In one example, the controller may refer a look-up table stored in the controller's memory having the exhaust oxygen sensor output as the input and the water injection amount to be commanded as the output. In another example, the look-up table may be stored having engine speed-load as the input and the water injection amount to be commanded as the output. The controller may send a pulse-width signal corresponding to the commanded amount to the manifold water injector. In this way, water injection via a manifold injector located upstream or downstream of a CAC may be used to meet a dilution demand of an engine under vacuum conditions.

At 330, if there is no dilution demand, the method continues at 340 to determine whether knock is detected. As discussed previously, the indication of knock may include detection of an actual knock event or anticipation of knock based on engine operating conditions. The controller may determine whether knock is occurring based on output from one or more knock sensors (such as knock sensors 183 shown in FIG. 1). In one example, engine knock may be indicated when the knock sensor output is higher than a knock threshold. In another example, engine knock may be anticipated when the engine speed and/or load is greater than a threshold, or when the engine knock history reflects a high propensity for knock (e.g., higher than threshold knock count). When the engine is knock limited, water injection may be used in order to provide charge cooling which reduces the propensity for further knock. If knock is not detected, the method at 342 includes maintaining water injection disabled. However, if knock is detected, the method at 344 includes determining whether water injection is possible. In one example, water injection may not be possible when water is not available for injection. As described above with regard to the method at 314, water injection may not be possible when water is not available for injection. If water injection is not possible, the method continues to 348 to retard spark timing. In response to the indication of knock, the controller may adjust one or more engine operating conditions to provide knock relief. For example, the controller may retard spark timing (further) from MBT, the degree of spark retard applied based on the knock intensity. In another example, the controller may additionally or alternatively increase a pulse width of fuel directly injected into the knock affected cylinder to enrich the combustion air-fuel ratio. Further still, the controller may reduce an amount of throttle opening to decrease manifold pressure.

However, if water injection is possible, at 346, the method includes injecting water into the intake manifold, at a location downstream of the CAC (post-CAC) until a limit is reached, and then direct injecting water. As described above with regard to the method at 316, the amount of water injected is based on the knock indication. In one example, the controller may refer a look-up table stored in the controller's memory having knock sensor output as the input and the water injection amount to be commanded as the output. In another example, the look-up table may be stored having engine speed-load as the input and the water injection amount to be commanded as the output. The controller may send a pulse-width signal corresponding to the commanded amount to the manifold water injector located downstream of the CAC. If the commanded water injection amount causes the manifold water injection to exceed a limit, then the controller may adjust the pulse width commanded to the manifold water injector until the water injection limit of the manifold injector is reached. Thereafter, a remainder of the total water amount to be commanded may be delivered by direct injecting water. Additionally or optionally, a remainder of the total water amount to be commanded may be delivered by port injecting water away from an open intake valve to increase the entrainment of water in the airflow, improving the charge cooling benefit of the port injection. In one example, the water injection limit of the manifold injector may include a pulse-width limit of the injector. In another example, the water injection limit of the manifold injector may be reached when the flow rate of the injector reaches a limit. In yet another example, the water injection limit of the manifold injector may be reached when the manifold humidity in the vicinity of the injector reaches a saturation limit. The determined (e.g. commanded) amount of water may be delivered into the intake manifold as a single pulse per engine cycle or as a series of pulses timed to the intake valve opening of each cylinder within the cylinder group downstream of the injector. In still further examples, the water injection amount may be adjusted based on the level of CAC condensate. By delivering water downstream of the CAC responsive to knock during boosted conditions, heat of evaporation is drawn from the manifold increasing the charge cooling effect of the water injection.

In this way, an engine controller may inject a larger proportion of water upstream than downstream of a charge air cooler while operating the cooler in a heating mode, and inject a larger proportion of water downstream than upstream of the charge air cooler while operating the cooler in a cooling mode. Injecting a larger proportion upstream than downstream of the charge air cooler includes determining a total amount of water to be injected into the engine based on engine operating conditions, and then delivering a larger proportion of the determined total amount of water to an upstream of the CAC location (such as via a manifold water injector) while delivering a remaining, smaller proportion of the determined total amount of water to a downstream of the CAC location (such as via a port or a direct water injector). At this time, the CAC is operated in the heating mode with the larger proportion of injected water being heated via heat transfer from a circulating coolant (into the water). As a result, more water is vaporized by the time it reaches the engine, allowing for more charge dilution. In comparison, injecting a larger proportion downstream than upstream of the charge air cooler includes determining a total amount of water to be injected into the engine based on engine operating conditions, and then delivering a larger proportion of the determined total amount of water to a downstream of the CAC location (such as via a port or direct water injector) while delivering a remaining, smaller proportion of the determined total amount of water to an upstream of the CAC location (such as via a manifold water injector). At this time, the CAC is operated in the cooling mode with heat being transferred into the circulating coolant from charge air flowing through the CAC, thereby increasing the amount of water that reaches the engine in liquid form, allowing for more charge cooling. In each case, the proportioning of the total amount of water is determined based on engine operating conditions (such as the presence or absence of boost pressure, ambient temperature and humidity, etc.) and further based on engine dilution demand relative to engine charge air cooling demand. In FIG. 4, graph 400 illustrates example adjustments to a water injection location and engine operation based on ambient air humidity and temperature. For example, graph 400 illustrates adjustments to water injection from a manifold water injector located upstream or downstream of a CAC. Specifically, the operating parameters illustrated in graph 400 show changes in engine speed at plot 402, changes in manifold air pressure (MAP) at plot 404, an amount of water injected via a pre-CAC water injector at plot 406, an amount of water injected via a post-CAC water injector at plot 408, changes in ambient humidity at plot 410, changes in ambient temperature at plot 412, changes in spark timing at plot 414, and changes in EGR flow at plot 416. For each operating parameter, time is depicted along the horizontal axis and values of each respective operating parameter are depicted along the vertical axis.

Prior to time t1, the engine is operating under natural aspiration due to engine speed and/or load being lower than a threshold (plot 402). At this time, no water injection is required.

At time t1, there is an increase in engine speed-load due to an increase in torque demand. However, boosted engine operation is not required so the engine continues to be operated with natural aspiration. Due to the move from low load to mid load conditions, an engine dilution demand increases. Due to water injection conditions being met, and since water is available, water is injected into the engine based on the dilution demand. In response to a relatively low ambient temperature (plot 412) and humidity (plot 410), the controller injects water via a pre-CAC water injector (plot 406) at time t1. The controller may determine an amount of water for water injection based on a dilution demand of the engine. During this time, CAC is operated in a heating mode and heat is transferred from coolant flowing through the CAC into the aircharge. As a result, the heat and humidity of the air increases, thereby increasing the charge dilution effect of the water injection.

At time t2, there is a further increase in operator torque demand. The engine, however, remains in the mid-load region and boosted engine operation is not required. There is a further increase in dilution demand. However at t2, the pre-CAC water injector is at an upper limit, and cannot provide further dilution. In response to the elevated dilution demand, the controller adjusts one or more other engine operating parameters to address the dilution demand. In the depicted example, the controller increases EGR flow (plot 416) while maintaining the pre-CAC water injection at the limit after time t2 to achieve the desired dilution demand. Alternatively, as indicated at dashed region 407, the controller may inject water at a post-CAC location while maintaining the pre-CAC water injection at the limit. Herein injecting at the post-CAC location may include port injecting water onto a closed, hot intake valve.

At time t3, there is a further increase in engine speed/load due to an increase in torque demand. Due to the increase in engine load, boosted engine operation is required and a turbocharger compressor output is increased to provide the desired boost pressure. As a result of boosted engine operation, MAP (plot 404) increases. Additionally, the controller disables water injection from the pre-CAC water injector and decreases EGR flow in response to a decreased dilution demand.

Between time t3 and t4, the engine speed and/or load increases (plot 402) due to an increase in torque demand. Additionally, the engine is operating under boosted conditions (plot 404). Water injection conditions are not met as the engine is not knock limited. Thus, the controller maintains water injection disabled (plots 406 and 408). Additionally, the ambient humidity (plot 410) and the ambient temperature (plot 412) increase. In one example, the ambient temperature and humidity may increase as a result of the vehicle being driven to a location with higher ambient temperature and humidity. In another example, ambient temperature and humidity may increase if current weather conditions change, such as due to the occurrence of rain.

At time t4, due to a further increase in engine speed/load due to a rise in operator torque demand (such as due to a tip-in to wide open throttle), the engine becomes knock limited. For example, engine knock is detected. At this time, since the engine is operating boosted and further since both ambient temperature and humidity are relatively high, the controller injects water into the engine at a post-CAC location, such as via the post-CAC manifold water injector. During this time, the CAC is operated in cooling mode. By operating the CAC in cooling mode, heat is transferred from the intake charge air to the coolant, thereby reducing the charge air temperature. As a result, a larger fraction of the water injected downstream of the CAC may evaporate locally, thereby increasing local charge cooling and decreasing knock tendency.

Then, at time t5, water injection from the post-CAC water injector reaches an upper limit (plot 408). However, knock relief is still required. In response to post-CAC water injection being at an upper limit, the controller maintains the post-CAC manifold water injection at the limit and adjusts one or more other engine operating parameters to address the engine knock. In the depicted example, the controller increases an amount of spark retard from MBT (plot 414) in response to knock. As such, the amount of spark retard applied is less than the spark retard that would have been required if no water was injected (as shown by dashed segment 413). Therefore by using water injection to address knock, fuel economy is improved. In an alternate example, where the engine is configured with direct water injection, instead of retarding spark timing, the controller may inject water via direct water injectors responsive to the post-CAC manifold water injector being at the upper limit to provide the additional charge cooling benefit. As a result of water injection and sparking timing adjustments knock decreases by time t6. At t6, due to knock being address and a drop in engine speed-load (due to a drop in driver demand), knock relief is no longer required. Therefore, the controller disables water injection (plot 408) and advances spark timing towards MBT (plot 414) at time t6.

In this way, the charge dilution benefit of a water injection may be enhanced during dry or cold ambient conditions by injecting the water upstream of a charge air cooler while the engine is not operating boosted. The technical effect of transferring heat from coolant circulating through the CAC to the aircharge flowing through the CAC is that water may be better entrained into the air, enabling warm, humid air to be provided to the engine. The warm, humid air generated via heat transfer into the air the CAC increases the dilution effect of the water, reducing engine pumping work and exhaust NOx. The charge cooling benefit of a water injection may be enhanced during humid or warm ambient conditions by injecting the water downstream of the charge air cooler while the engine is operating boosted. The technical effect of drawing heat from the aircharge flowing through the CAC into the coolant circulating through the CAC is that the dew point of the aircharge may be lowered, enabling more water to be provided in liquid form at the manifold. At the manifold, the water may be evaporated by drawing heat from the ambient air, increasing the cooling effect of the water, and reducing knock propensity. By improving water usage, water injection benefits may be extended over a wider range of engine operating conditions. Overall, engine performance and fuel economy is improved.

As one embodiment, a method includes injecting a larger proportion of water upstream of a charge air cooler while operating the cooler in a heating mode; and injecting a larger proportion of water downstream of the charge air cooler while operating the cooler in a cooling mode. In a first example of the method, the method further includes wherein the injecting water upstream of the charge air cooler is responsive to an ambient temperature being lower than a threshold, and the injecting water downstream of the charge air cooler is responsive to the ambient temperature being higher than the threshold. A second example of the method optionally includes the first example and further includes wherein the injecting water upstream of the charge air cooler is responsive to an ambient humidity being lower than a threshold, and the injecting water downstream of the charge air cooler is responsive to the ambient humidity being higher than the threshold. A third example of the method optionally includes one or more of the first and second examples, and further includes wherein operating the cooler in the heating mode includes operating the engine with natural aspiration, and wherein operating the cooler in the cooling mode includes operating the engine boosted. A fourth example of the method optionally includes one or more of the first through third examples, and further includes wherein the injecting water upstream of the charge air cooler is responsive to an engine dilution demand, and the injecting water downstream of the charge air cooler is responsive to an engine cooling demand. A fifth example of the method optionally includes the first through fourth examples, and further includes wherein an amount of water injected upstream of the charge air cooler is based on each of the engine dilution demand, manifold pressure, and ambient temperature, and wherein the amount of water injected downstream of the charge air cooler is based on each of the engine cooling demand, a boost pressure, and a charge cooler condensate level. A sixth example of the method optionally includes the first through fifth examples, and further includes wherein operating the cooler in the heating mode includes transferring heat from a coolant circulating through the heat exchanger to air flowing through the heat exchanger, and wherein operating the cooler in the cooling mode includes transferring heat from the air flowing through the heat exchanger to the coolant circulating through the heat exchanger. A seventh example of the method optionally includes the first through sixth examples, and further includes wherein an air temperature at an outlet of the charge air cooler is at a (common) temperature setting when operating the cooler in each of the heating mode and the cooling mode, the temperature setting selected based on a knock limit of the engine. An eighth example of the method optionally includes the first through seventh examples, and further comprises, adjusting a first set of engine operating parameters responsive to the injecting water upstream of the charge air cooler, and adjusting a second, different set of engine operating parameters responsive to the injecting water downstream of the charge air cooler. A ninth example of the method optionally includes the first through eighth examples, and further includes wherein the first set of engine operating parameters includes an EGR flow rate, and wherein the second set of engine operating parameters includes spark timing.

As another embodiment, a method comprises during a first condition, when each of ambient temperature and ambient humidity is lower, injecting water upstream of a charge air cooler to raise a temperature and humidity of charge delivered to the engine; and during a second condition, when each of ambient temperature and ambient humidity is higher, injecting water downstream of the charge air cooler to lower the temperature of the charge delivered to the engine. In a first example of the method, the method further includes wherein during the first condition, the engine is operating with natural aspiration and wherein during the second condition, the engine is operating with boost. A second example of the method optionally includes the first example and further includes wherein during the first condition, the engine is dilution limited, and an amount of water injected upstream of the charge air cooler is based on engine dilution demand and manifold pressure, and wherein during the second condition, the engine is knock limited, and the amount of water injected downstream of the charge air cooler is based on an engine knock limit and boost pressure. A third example of the method optionally includes one or more of the first and second examples, and further includes wherein during both the first and second condition, the amount of water injected is further based on a condensate level at the charge air cooler. A fourth example of the method optionally includes the first through third examples, and further comprises, during the first condition, adjusting an opening of an EGR valve based on the amount of water injected upstream of the charge air cooler, and during the second condition, adjusting spark timing based on the amount of water injected downstream of the charge air cooler. A fifth example of the method optionally includes the first through fourth examples, and further comprises, during both the first and second condition, flowing air through the charge air cooler, and circulating a coolant, coupled to an engine coolant system, through the charge air cooler, wherein during the first condition, heat is transferred from the coolant to the air, and wherein during the second condition, heat is transferred from the air to the coolant. A sixth example of the method optionally includes the first through fifth examples, and further comprises, during both the first and the second condition, maintaining a temperature of air exiting the charge air cooler at a target temperature, the target temperature selected as a function of a knock limit of the engine when operating with boost.

As yet another embodiment, a system includes an engine; a compressor for providing a boosted aircharge to the engine; a charge air cooler coupled downstream of the compressor; a coolant system for circulating coolant through the charge air cooler and the engine; a first water injector coupled upstream of the charge air cooler and downstream of the compressor; a second water injector coupled downstream of the charge air cooler; an EGR passage including an EGR valve for recirculating exhaust gas from an exhaust manifold to an intake manifold, upstream of the compressor; a humidity sensor coupled to the intake manifold, upstream of the compressor, for estimating an ambient humidity; a temperature sensor coupled to the intake manifold, upstream of the compressor, for estimating an ambient temperature; and a controller with computer readable instructions for: responsive to ambient temperature being lower than a threshold temperature, injecting more water into the engine, upstream of the charge air cooler than downstream of the charge cooler, while maintaining the compressor disabled; and responsive to ambient temperature being higher than the threshold temperature, injecting more water into the engine, downstream of the charge air cooler than upstream of the charge air cooler, while enabling the compressor. In a first example of the system, the system further includes wherein a proportion of a total water injection amount that is injected upstream of the charge air cooler is increased as the ambient temperature decreases, and wherein the proportion of the total water injection amount that is injected downstream of the charge air cooler is increased as the ambient temperature increases. A second example of the system optionally includes the first example and further includes wherein the controller includes further instructions for: decreasing an opening of the EGR valve responsive to the proportion of water injected upstream of the charge air cooler; and advancing spark timing responsive to the proportion of water injected downstream of the charge air cooler.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   injecting a larger proportion of water upstream than downstream of a charge air cooler while operating the cooler in a heating mode; and
   injecting a larger proportion of water downstream than upstream of the charge air cooler while operating the cooler in a cooling mode.

2. The method of claim 1, wherein the injecting a larger proportion of water upstream of the charge air cooler is responsive to an ambient temperature being lower than a threshold, and the injecting a larger proportion of water downstream of the charge air cooler is responsive to the ambient temperature being higher than the threshold.

3. The method of claim 1, wherein the injecting a larger proportion of water upstream of the charge air cooler is responsive to an ambient humidity being lower than a threshold, and the injecting a larger proportion of water downstream of the charge air cooler is responsive to the ambient humidity being higher than the threshold.

4. The method of claim 1, wherein operating the cooler in the heating mode includes operating the engine with natural aspiration, and wherein operating the cooler in the cooling mode includes operating the engine boosted.

5. The method of claim 4, wherein the injecting a larger proportion of water upstream of the charge air cooler is responsive to an engine dilution demand, and the injecting a larger proportion of water downstream of the charge air cooler is responsive to an engine cooling demand.

6. The method of claim 5, wherein an amount of water injected upstream of the charge air cooler is based on each of the engine dilution demand, manifold pressure, and ambient temperature, and wherein the amount of water injected downstream of the charge air cooler is based on each of the engine cooling demand, a boost pressure, and a charge cooler condensate level.

7. The method of claim 1, wherein operating the cooler in the heating mode includes transferring heat from a coolant circulating through the heat exchanger to air flowing through the heat exchanger, and wherein operating the cooler in the cooling mode includes transferring heat from the air flowing through the heat exchanger to the coolant circulating through the heat exchanger.

8. The method of claim 1, wherein an air temperature at an outlet of the charge air cooler is at a (common) temperature setting when operating the cooler in each of the heating mode and the cooling mode, the temperature setting selected based on a knock limit of the engine.

9. The method of claim 1, further comprising, adjusting a first set of engine operating parameters responsive to the injecting water upstream of the charge air cooler, and adjusting a second, different set of engine operating parameters responsive to the injecting water downstream of the charge air cooler.

10. The method of claim 9, wherein the first set of engine operating parameters includes an EGR flow rate, and wherein the second set of engine operating parameters includes spark timing.

11. A method for an engine, comprising:
during a first condition, when each of ambient temperature and ambient humidity is lower, injecting water upstream of a charge air cooler to raise a temperature and humidity of charge delivered to the engine; and
during a second condition, when each of ambient temperature and ambient humidity is higher, injecting water downstream of the charge air cooler to lower the temperature of the charge delivered to the engine.

12. The method of claim 11, wherein during the first condition, the engine is operating with natural aspiration and wherein during the second condition, the engine is operating with boost.

13. The method of claim 11, wherein during the first condition, the engine is dilution limited, and an amount of water injected upstream of the charge air cooler is based on engine dilution demand and manifold pressure, and wherein during the second condition, the engine is knock limited, and the amount of water injected downstream of the charge air cooler is based on an engine knock limit and boost pressure.

14. The method of claim 13, wherein during both the first and second condition, the amount of water injected is further based on a condensate level at the charge air cooler.

15. The method of claim 11, further comprising, during the first condition, adjusting an opening of an EGR valve based on the amount of water injected upstream of the charge air cooler, and during the second condition, adjusting spark timing based on the amount of water injected downstream of the charge air cooler.

16. The method of claim 11, further comprising, during both the first and second condition, flowing air through the charge air cooler, and circulating a coolant, coupled to an engine coolant system, through the charge air cooler, wherein during the first condition, heat is transferred from the coolant to the air, and wherein during the second condition, heat is transferred from the air to the coolant.

17. The method of claim 11, further comprising, during both the first and the second condition, maintaining a temperature of air exiting the charge air cooler at a target temperature, the target temperature selected as a function of a knock limit of the engine when operating with boost.

18. An engine system, comprising:
an engine;
a compressor for providing a boosted aircharge to the engine;
a charge air cooler coupled downstream of the compressor;
a coolant system for circulating coolant through the charge air cooler and the engine;
a first water injector coupled upstream of the charge air cooler and downstream of the compressor;
a second water injector coupled downstream of the charge air cooler;
an EGR passage including an EGR valve for recirculating exhaust gas from an exhaust manifold to an intake manifold, upstream of the compressor;
a humidity sensor coupled to the intake manifold, upstream of the compressor, for estimating an ambient humidity;
a temperature sensor coupled to the intake manifold, upstream of the compressor, for estimating an ambient temperature; and
a controller with computer readable instructions for:
responsive to ambient temperature being lower than a threshold temperature, injecting more water into the engine, upstream of the charge air cooler than downstream of the charge cooler, while maintaining the compressor disabled; and
responsive to ambient temperature being higher than the threshold temperature, injecting more water into the engine, downstream of the charge air cooler than upstream of the charge air cooler, while enabling the compressor.

19. The system of claim 18, wherein a proportion of a total water injection amount that is injected upstream of the charge air cooler is increased as the ambient temperature decreases, and wherein the proportion of the total water injection amount that is injected downstream of the charge air cooler is increased as the ambient temperature increases.

20. The system of claim 19, wherein the controller includes further instructions for:
decreasing an opening of the EGR valve responsive to the proportion of water injected upstream of the charge air cooler; and
advancing spark timing responsive to the proportion of water injected downstream of the charge air cooler.

* * * * *